United States Patent [19]
Ishikawa

[11] Patent Number: 5,154,555
[45] Date of Patent: Oct. 13, 1992

[54] EQUAL-PITCH GROOVE PROCESSING DEVICE

[75] Inventor: Tadayuki Ishikawa, Hirakata, Japan

[73] Assignee: Kabushiki Kaisha Komatsu Seisakusko

[21] Appl. No.: 499,340

[22] PCT Filed: Oct. 20, 1989

[86] PCT No.: PCT/JP89/01081
   § 371 Date: Jun. 15, 1990
   § 102(e) Date: Jun. 15, 1990

[87] PCT Pub. No.: WO90/04477
   PCT Pub. Date: May 3, 1990

[30] Foreign Application Priority Data
   Oct. 20, 1988 [JP] Japan .................. 63-265134

[51] Int. Cl.⁵ ............................. B23D 37/14
[52] U.S. Cl. ...................... 409/246; 83/672; 409/259; 409/268; 409/275
[58] Field of Search .............. 409/38, 39, 66, 75, 409/76, 77, 157, 246, 259, 260, 268, 275; 51/80 A, 87 R, 287, 95 TG; 83/340, 372, 865, 885; 29/890.048

[56] References Cited

U.S. PATENT DOCUMENTS

| | | | |
|---|---|---|---|
| 2,202,428 | 5/1940 | Poock | 409/157 |
| 3,064,506 | 11/1962 | Nihlen et al. | 29/890.048 X |
| 3,504,718 | 4/1970 | Pittman et al. | 83/672 X |
| 3,630,126 | 12/1971 | Ronai | 83/672 X |
| 3,901,114 | 8/1975 | Cage | 83/340 |

FOREIGN PATENT DOCUMENTS

| | | | |
|---|---|---|---|
| 1909803 | 2/1969 | Fed. Rep. of Germany | 83/672 |
| 49-116674 | 10/1974 | Japan . | |
| 63-144908 | 8/1988 | Japan | 409/66 |
| 0916650 | 1/1963 | United Kingdom | 29/890.048 |

Primary Examiner—Z. R. Bilinsky
Attorney, Agent, or Firm—Skjerven, Morrill, MacPherson, Franklin & Friel

[57] ABSTRACT

The equal-pitch groove processing device (1) comprises transferring means (10), (40) for continuously transferring a workpiece (100) in an axial direction of the workpiece (100); processing tools (23), (33) in which cutting teeth (23a) of a thickness corresponding to a width of a groove to be processed are formed around an outer peripheral portion along a spiral path, and which is rotatively driven with the center of that spiral as an axis; and controlling means (70), (80) for synchronously operating the processing tools (23), (33) in such a manner that the workpiece (100) is transferred by a one-normal-pitch portion of the spiral while the processing tools (23), (33) undergo one revolution, whereby equal-pitch grooves are formed in the workpiece (100) by the cutting teeth (23a) of the processing tools (23), (33).

6 Claims, 3 Drawing Sheets

EQUAL-PITCH GROOVE PROCESSING DEVICE

DESCRIPTION

1. Technical Field

The present invention relates to an equal-pitch groove processing device for use in processing fins of a heat exchanger and the like.

2. Background Art

Fins of a heat exchanger, for instance, are fabricated by forming a multiplicity of grooves in an elongated material at equal pitches.

To form the aforementioned grooves, a method is used in which the aforementioned grooves are formed consecutively one by one by means of an NC milling machine having a thin-blade side cutter mounted thereon, or a method is used in which a plurality of grooves are formed at a time by using a multi-side cutter.

In the method for forming the grooves one by one by using a thin-blade side cutter, each time one groove is processed, it is necessary to relatively move the thin-blade side cutter and a workpiece by predetermined amounts after the thin-blade side cutter is returned to a cutting start position. For this reason, there is a drawback in that substantial time is required for processing one workpiece.

In addition, in the method using a multi-side cutter, although the time for processing a workpiece is shortened, since a multiplicity of cutters are required, there is a drawback in that an operation for managing the life of each cutter and an operation at the time of replacing the cutters become complicated.

In view of the above-described circumstances, an object of the present invention is to provide an equal-pitch groove processing device which is capable of processing equal-pitch grooves efficiently by overcoming the above-described drawbacks.

DISCLOSURE OF THE INVENTION

An equal-pitch groove processing device in accordance with the present invention comprises: transferring means for continuously transferring a workpiece along an axial direction of the workpiece; a processing tool in which a cutting tooth of a thickness corresponding to a width of a groove to be processed is formed in an outer peripheral portion along a spiral path, and which is rotatively driven with a center of the spiral as an axis; and controlling means for synchronously operating the processing tool and the transferring means in such a manner that the workpiece is transferred by a one-normal-pitch portion of the spiral while the processing tool undergoes one revolution.

In accordance with this equal-pitch groove processing device, equal-pitch grooves are formed consecutively in the workpiece by means of one processing tool while the workpiece is being transferred continuously.

Accordingly, no substantial time is required in processing a workpiece, and a plurality of tools are not required, so that it is possible to process equal-pitch grooves efficiently.

BEST MODE FOR CARRYING OUT THE INVENTION

Figure 1:
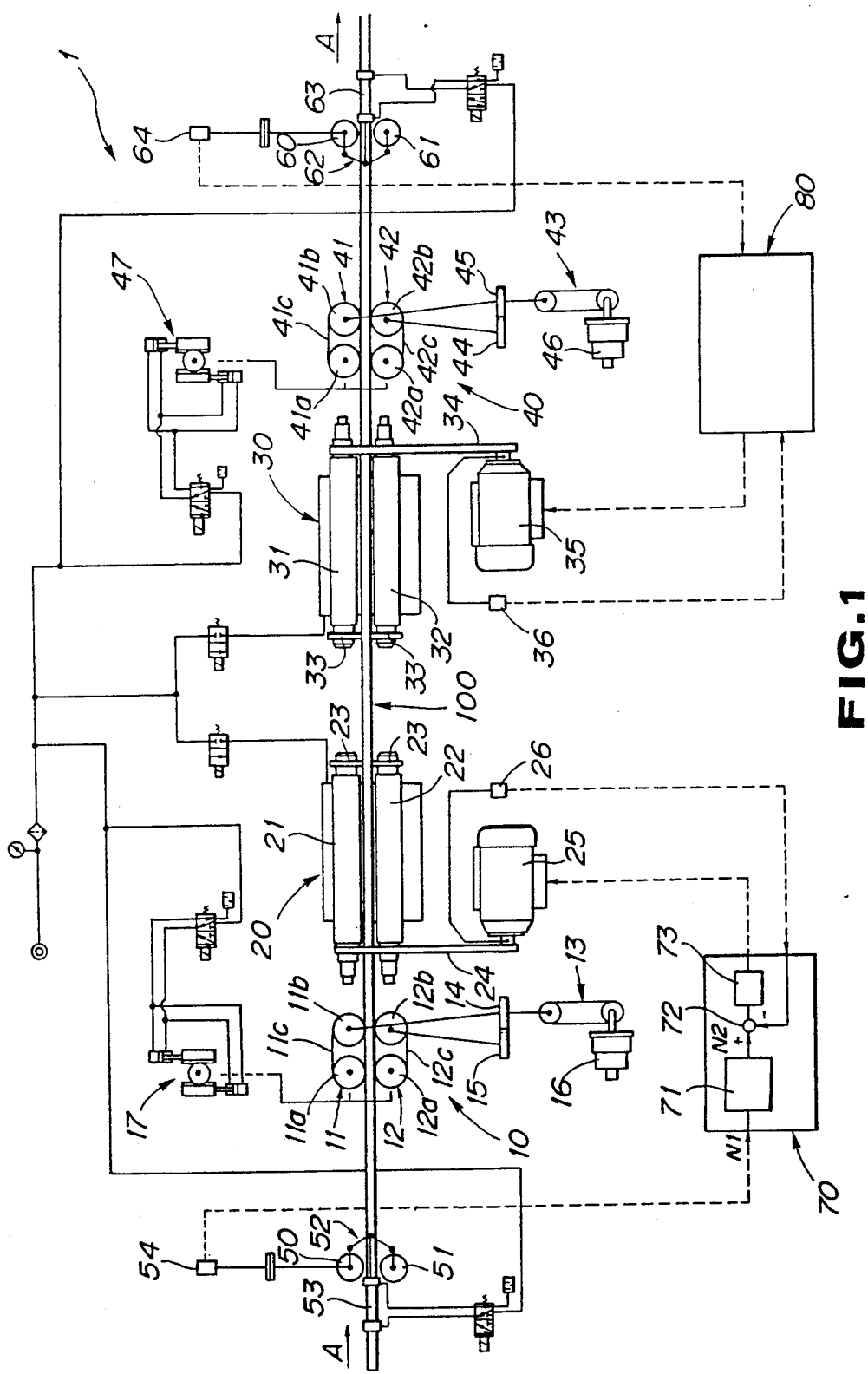
FIG. 1 is a conceptual diagram illustrating an overall configuration of an equal-pitch processing device in accordance with the present invention.

Referring now to the drawings, a description will be given of an embodiment of the present invention.

FIG. 1 conceptually shows an equal-pitch processing device 1 in accordance with the present invention.

In this equal-pitch processing device 1, a first transfer section 10, a first processing section 20, a second processing section 30, and a second transfer section 40 are disposed consecutively from the left, as viewed in the drawing, along a workpiece 100 extending in a longitudinal direction as viewed in the drawing.

The first transfer section 10 is situated on the upstream side of the first processing section 20 and has belt-type transfer mechanisms 11 and 12 disposed in such a manner as to face each other with the workpiece 100 placed therebetween.

The belt-type transfer mechanism 11 has transfer rollers 11a, 11b and a belt 11c trained between the two rollers, while the transfer mechanism 12 has transfer rollers 12a, 12b and a belt 12c trained between the two rollers.

The two belt-type transfer mechanisms 11 and 12 are driven by a drive motor 16 for transfer via gears 14, 15, and continuously transfers the workpiece 100 at a predetermined speed in the direction of arrow A, i.e., along the axial direction of the workpiece 100. The workpiece 100 does not rotate about any axis as it is moved along the direction of arrow A. The grooves cut in the workpiece define the fins of a heat exchanger between them.

In addition, as for the two belt-type transfer mechanisms 11 and 12, the distance therebetween is adjusted by means of a rack-and-pinion mechanism 17 to regulate a pressing force applied to the workpiece 100.

Meanwhile, the second transfer section 40 is situated on the downstream side of the second processing section 30 and has belt-type transfer mechanisms 41 and 42 disposed in such a manner as to face each other with the workpiece 100 placed therebetween.

The belt-type transfer mechanism 41 has transfer rollers 41a, 41b and a belt 41c, while the transfer mechanism 42 has transfer rollers 42a, 42b and a belt 42c. The two belt-type transfer mechanisms 41, 42 are driven by a drive motor 46 for transfer via a belt transmission mechanism 43 and gears 44, 45 and continuously transfer the workpiece 100 at a predetermined speed in the direction of arrow A in the drawing. In addition, as for the two transfer mechanisms 41 and 42, the distance therebetween is adjusted by means of a rack-and-pinion mechanism 47.

Here, the transfer speed of the workpiece in the second transfer section 40 is set to be faster than the transfer speed of the workpiece in the first transfer section 10. For this reason, the workpiece 100 is transferred without being deflected by a tensile force produced between the first transfer section 10 and the second transfer section 40.

Figure 2:
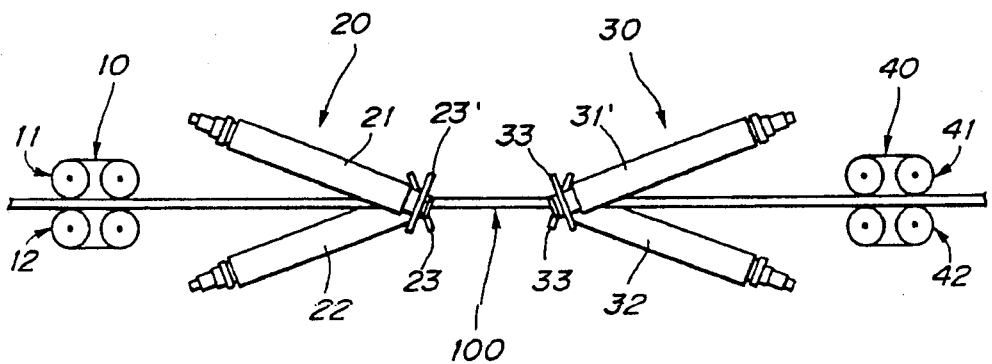
FIG. 2 is a conceptual diagram of the aforementioned equal-pitch processing device as viewed from the top.

In FIG. 1, the belt-type transfer mechanisms 11, 12 in the first transfer section 10 and the belt-type transfer mechanisms 41, 42 in the second transfer section 40 are respectively depicted as being disposed in upper and lower positions with the workpiece 100 placed therebetween. In practice, however, these belt-type transfer mechanisms are disposed in such a manner as to clamp the workpiece 100 at transversely opposite sides thereof, as shown in FIG. 2 in which the equal pitch groove processing device 1 is viewed from the top.

The first processing section 20 is disposed in an area downstream of the transfer section 10.

The first processing section 20 has drive shafts 21 and 22 disposed in upper and lower positions with the workpiece 100 placed therebetween, in such a manner as to face each other, processing tools 23 and 23' being mounted on each of the drive shafts 21, 22, respectively.

The processing tools 23, 23' are rotatively driven by a processing tool driving motor 25 which rotatively drives the two drive shafts 21, 22 via a power transmission belt 24. Incidentally, a revolution detector 26 is linked with the motor 25.

Meanwhile, the second processing section 30 is disposed in an area downstream of the first processing section 20, and this second processing section 30 has drive shafts 31 and 32 disposed in upper and lower positions with the workpiece 100 placed therebetween, in such a manner as to face each other.

The processing tools 33 and 33' are mounted on each of the drive 31, 32, respectively and each of these processing tools 33, 33' is rotatively driven by a processing tool driving motor 35 which rotatively drives the two drive shafts 31, 32 via a power transmission belt 34. A revolution detector 36 is linked with this motor 35.

Figure 3A:
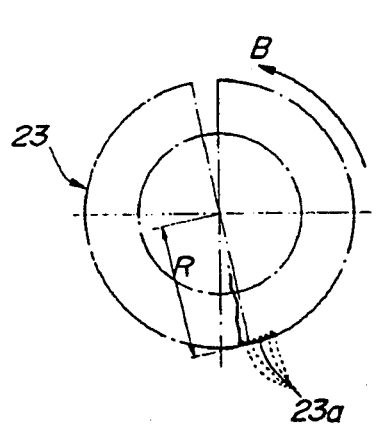
FIGS. 3(a) and 3(b) are a front elevational view and a side elevational view of the processing tool, respectively.
Figure 3B:
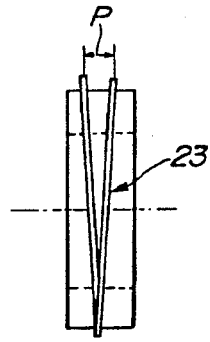

As shown in FIGS. 3(a) and 3(b), the processing tool 23 in the first processing section 20 has a configuration of a spiral plate provided with an outer peripheral portion along a spiral path with the central axis of rotation as its axis, a multiplicity of cutting teeth 23a of a broach being formed and arranged on the aforementioned outer peripheral portion. In addition, the processing tool 23 has the same normal pitch of a spiral lead as the normal pitch of the groove to be processed.

The cutting teeth 23a, 23a, . . . , are respectively formed in a projecting manner such that a radius R from the rotational center of the processing tool 23 to the tip of a given cutting tooth is longer by a predetermined amount of cut in a radially outward direction than the radius R of a preceding cutting tooth at the time of the rotation of the processing tool 23 in the direction of arrow B. In addition, the cutting teeth 23a have a tooth thickness corresponding to the width of the respective grooves to be processed.

It goes without saying that the pitch of the processing tools 23 and 23', the number of the cutting teeth 23a, the tooth thickness, the radius R at each of the cutting teeth 23a, and the like may be set appropriately depending on the dimensions and specifications such as the pitch of the grooves to be processed and the groove width.

In addition, the processing tools 33 in the second processing section 30 are formed in the same manner as that of the aforementioned processing tool 23 excepting the fact the direction of the helix at the outer peripheral portion is opposite.

As shown in FIG. 1, the axes of rotation of the drive shafts 21, 22 in the first processing section 20, i.e., the axes of rotation of the processing tools 23, 23' are respectively positioned in a pair of planes that are parallel with the axis of the workpiece 100 in its direction of transfer and are parallel with each other. In addition, an interval between the axis of rotation of the processing tools 23, 23' and a surface of the workpiece 100 is set in such a manner that grooves of a desired depth will be formed in the workpiece 100 by means of the cutting teeth having a maximum cutting tooth radius R in the processing tool 23. Furthermore, as shown in FIG. 2, the axes of rotation of the drive shafts 21, 22 are positioned in such a manner as to be inclined in mutually different directions with respect to the axis of the workpiece 100 in its direction of transfer.

Meanwhile, the axes of rotation of the drive shafts 31, 32 in the second processing section 30, i.e., the axes of rotation of the processing tools 33, 33' are respectively positioned in the same planes as those in which the axes of rotation of the drive shafts 21, 22 in the first processing section 20 are positioned. An interval between the axis of rotation of the processing tools 33, 33' and a surface of the workpiece 100 is also set in the same manner as the processing tool 23. In addition, as shown in FIG. 2, the axes of rotation of the drive shafts 31, 32 are positioned in such a manner as to be inclined in mutually different directions with respect to the direction of transfer of the workpiece 100. Furthermore, as is apparent from FIG. 2, the drive shaft 21 in the first processing section 20, the drive shaft 31 in the second processing section 30, the drive shaft 22 in the first processing section 20, and the drive shaft 32 in the second processing section 30 are respectively positioned in such a manner as to be inclined by an equal angle (swiveling angle) in mutually different directions with respect to the axis of the workpiece 100 in its direction of transfer.

Here, the axes of rotation of the drive shafts 21, 22 and the drive shafts 31, 32 are positioned such that, if it is assumed that an angle of inclination formed by each groove to be formed in the workpiece 100 with respect to the transverse direction of the workpiece 100 is $\beta$, an angle (swiveling angle) formed between the axis of the workpiece 100 in its direction of transfer and the axis of rotation of each of the drive shafts 21, 22, 31, 32 is $\theta$, and a lead angle in each of the processing tools 23, 33 is $\alpha$, and the clockwise direction is assumed to be positive, then the drive shafts 21, 22, 31, 33 satisfy the relationship of $\beta = \theta + \alpha$.

As is clearly shown in FIG. 1, detection rollers 50, 51 are disposed in an area upstream of the first transfer section 10 with the workpiece 100 placed therebetween, and these detection rollers 50, 51 are brought into contact with and move away from the workpiece 100 through the operation of a cylinder actuator 53 via a link mechanism 52. In addition, a rotational speed detector 54 is linked with the detection roller 50 as a means for detecting the transfer speed of the workpiece 100.

Meanwhile, disposed in an area downstream of the second transfer section 40 are detection rollers 60, 61, a link mechanism 62, and a cylinder actuator 63, a rotational speed detector 64 being linked with the detection roller 60 as a means for detecting the transfer speed of the workpiece 100.

The operation of this embodiment will be described hereinunder.

Now, when the equal-pitch groove processing device 1 starts the operation, and the workpiece 100 begins to be transferred, a signal representing the transfer speed of the workpiece 100, i.e., a rotational speed N1 of the aforementioned detection roller 50, is output from the rotational speed detector 54, and this signal is input to a coefficient circuit 71 of a synchronous control section 70.

This coefficient circuit 71 multiplies the aforementioned rotational speed N1 by a coefficient K to create a targeted speed N2 of the workpiece driving motor 25. The coefficient K is set in such a manner that the processing tools 23, 23' undergo just one revolution while the workpiece 100 is being transferred by one pitch of the grooves to be processed.

In a subtractor 72, a deviation between the signal representing the targeted speed N2 on the one hand, and the output signal from the revolution detector 26 representing the number of revolutions of the motor 25 on the other, is determined. Then, the signal representing the deviation is applied to the motor 25 via a motor drive circuit 73.

As a result, the first transfer section 10 and the first processing section 20 are synchronously operated in such a manner that the processing tools 23, 23' will undergo one revolution while the workpiece 100 is being fed by one pitch of the grooves.

Meanwhile, in the second processing section 30 as well, the transfer speed of the workpiece 100 and the rotational speeds of the processing tools 33, 33' are naturally synchronized.

Control for this synchronization is also executed by a synchronous control section 80 having a similar configuration to that of the aforementioned synchronous control section 70 on the basis of the output signals of the revolution detector 36 and the revolution detector 64.

As described above, since the transfer speed of the workpiece 100 and the rotational speeds of the processing tools 23, 23' and 33, 33' are synchronized with each other, grooves are formed in the workpiece 100 at equal pitches by the first processing section 20, and grooves are then formed therein at equal pitches by the second processing section 30 as well.

Here, as described earlier, since the drive shafts 21, 22 and the drive shafts 31, 32 have equal swiveling angles and directions of their inclination are opposite, and since the processing tools 23, 23' and the processing tools 33, 33' have mutually opposite directions of the helix at their outer peripheral portions, grooves that are mutually oppositely oriented and have equal angles of inclination with respect to the transverse direction of the workpiece 100 are formed in an intersecting manner in the surfaces of the workpiece 100 which has passed the second processing section 30.

It should be noted that although in the above-described synchronous operation control the rotational speeds of the processing tools are controlled on the basis of the transfer speed of the workpiece, it is possible to effect the control on the basis of opposite relationships thereto.

In this case, if an explanation is given by citing the first processing section 20 as an example, the output signal of the revolution detector 26 is input to the coefficient circuit 71, and the output signal of the revolution detector 54 is fed back to the subtractor 72. Then, the drive motor 16 for transfer is driven by an output of the motor drive circuit 73. Incidentally, in this case, it goes without saying that the coefficient of the coefficient circuit 71 is set appropriately in such a manner that the workpiece 100 is transferred by one pitch of the grooves while the processing tools 23 undergo one revolution.

Figure 4:
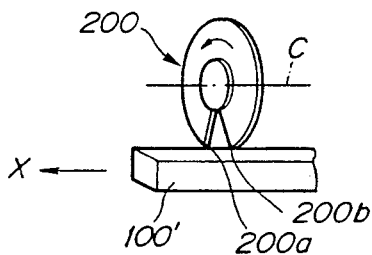
FIGS. 4, 5, and 6 are a perspective view, a top plan view, and a side elevational view illustrating positional relationships between the processing tool and a workpiece in accordance with another embodiment, respectively.
Figure 5:
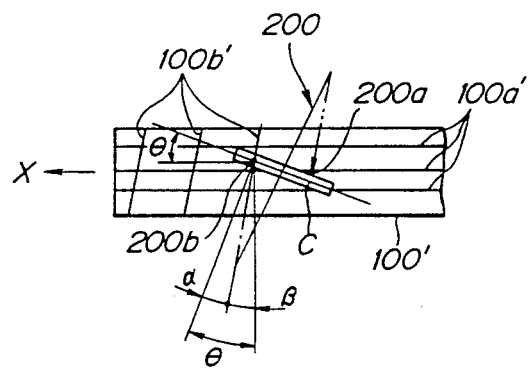
Figure 6:
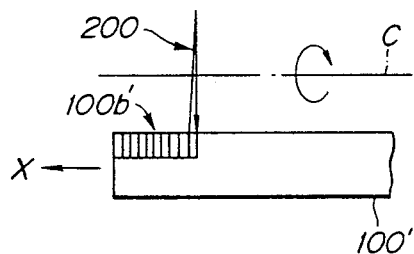

In an embodiment shown in FIGS. 4 to 6, grooves 100$b'$ are formed in a workpiece 100', in which grooves 100$a'$ are formed in advance along the direction of transfer, in the transverse direction of the workpiece 100' by means of a processing tool 200.

As shown in FIG. 5, a central axis C of rotation of the processing tool 200 is inclined with respect to an axis of the workpiece 100' in its direction of transfer, and the grooves 100$b'$ are inclined with respect to the transverse direction of the workpiece 100'.

Here, if the swivel angle of the central axis C of rotation in the processing tool 200 is $\theta$, the lead angle of the processing tool 200 is $\alpha$, and the angle of inclination formed by each groove 100$b'$ with respect to the transverse direction of the workpiece 100' is $\beta$, and the clockwise direction is assumed as being positive with respect to all the angles, then the swivel angle $\theta$ becomes positive, the lead angle $\alpha$ becomes negative since the processing tool 200 is left-handed and is inclined counterclockwise, and the angle of inclination $\beta$ becomes positive since it is inclined clockwise. For this reason, $\beta = \theta - (-\alpha)$, and, as mentioned previously, the central axis C of rotation of the processing tool 200 is positioned in such a manner as to satisfy the relation, $\beta = \theta + \alpha$, so as to obtain a desired angle of inclination $\beta$.

In addition, as is apparent from the respective drawings, when cutting is effected with respect to the workpiece 100' which is transferred in the direction of arrow X by allowing a cutting tooth 200$a$ having a smaller cutting tooth radius to proceed a cutting tooth 200$b$ having a larger cutting tooth radius, it can be understood that it suffices if the processing tool 200 is rotated clockwise as viewed from the right-hand direction in FIG. 5. In addition, in cases where the helix of the processing tool is opposite, it is also evident that it suffices if the processing tool is rotated counterclockwise. In this case, however, the swivel angle $\theta$ assumes a different value.

Figure 7:
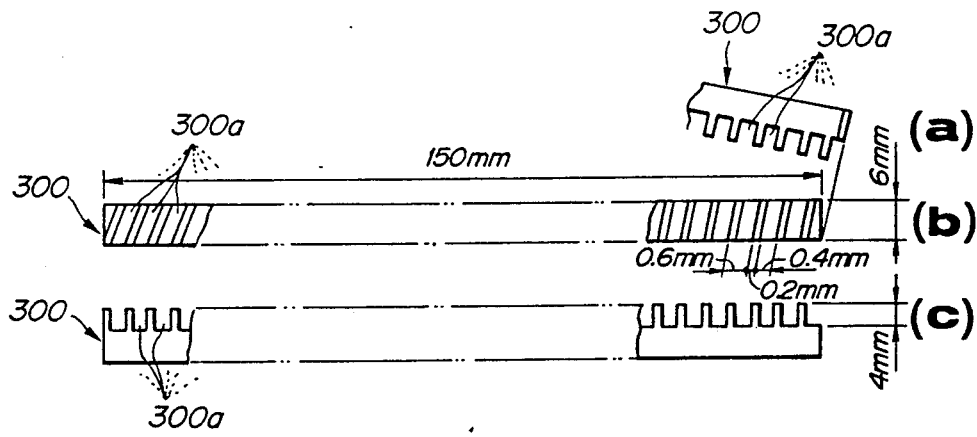
FIGS. 7(a), 7(b), and 7(c) are a side elevational view of one side, a top plan view, and a side elevational view of the other side, illustrating the workpiece provided with groove processing, respectively.

FIGS. 7(a)-7(c) illustrate an example of the workpiece provided with groove processing, in which a plurality of grooves 300$a$ are formed in a surface of a workpiece 300 on one side thereof at equal pitches.

By using a processing tool of the specifications shown in Table 1, by setting the cutting speed to 1,500 m/min (the revolution of the processing tool: 3,820 rpm), the transfer speed of the workpiece to 2,290 mm/min, and a maximum amount of cut (groove depth) to 4 mm, and by using a water-soluble (diluted by 50-fold) cutting fluid, it was possible to process grooves with a width of 0.4 mm, a pitch of 0.6 m, and a depth of 4 mm at a speed of 3 m/min.

TABLE 1

| Tooth No. N | Tooth Radius: R | Angular Position |
|---|---|---|
| 1 | 58.138 | 0 |
| 2 | 58.150 | 1 |
| 3 | 58.163 | 2 |
| 4 | 58.175 | 3 |
| 5 | 58.188 | 4 |
| 6 | 58.200 | 5 |
| 7 | 58.213 | 6 |
| 8 | 58.225 | 7 |
| 9 | 58.238 | 8 |
| 341 | 62.388 | 340 |
| 342 | 62.400 | 341 |

TABLE 1-continued

| Tooth No. N | Tooth Radius: R | Angular Position |
| --- | --- | --- |
| 343 | 62.413 | 342 |
| 344 | 62.425 | 343 |
| 345 | 62.438 | 344 |
| 346 | 62.450 | 345 |
| 347 | 62.463 | 346 |
| 348 | 62.475 | 347 |
| 349 | 62.488 | 348 |
| 350 | 62.500 | 349 |

INDUSTRIAL APPLICABILITY

The equal-pitch groove processing device according to the present invention is useful for forming grooves in various types of workpieces at equal pitches.

In particular, it is suitably adopted in cases where fins of heat exchangers are formed.

I claim:

1. An equal-pitch groove processing device characterized by comprising:

transferring means for continuously transferring a workpiece along an axial direction of said workpiece;

a plurality of processing tools arrayed along the direction of transverse of said workpiece, each said processing tool having a cutting tooth of a thickness corresponding to a width of a groove to be processed is formed in an outer peripheral portion along a spiral path, and which is rotatively driven with a center of said spiral path as an axis and wherein said processing tools are dispersed in an identical plane parallel with the axis of said workpiece in a direction of its transfer in such a manner as to be inclined in mutually different directions with respect to the axis of said workpiece in the direction of its transfer; and controlling means for synchronously operating said processing tool and said transferring means in such a manner that said workpiece is transferred by a one-normal-pitch portion of said spiral while said processing tool undergoes one revolution, whereby equal-pitch grooves are formed in said workpiece by said cutting tooth of said processing tool.

2. An equal-pitch groove processing device according to claim 1, wherein said plurality of processing tools are disposed in such a manner as to face each other with said workpiece placed therebetween.

3. An equal-pitch groove processing device according to claim 1, wherein said transferring means comprises a first transfer section disposed upstream of said processing tool and a second transfer section which is disposed downstream of said processing tool and for which a transfer speed of said workpiece is set to be higher than for said first transfer section.

4. An equal-pitch groove processing device according to claim 1, wherein, as for said cutting tooth of said processing tool, a plurality of cutting teeth are fomred around the outer peripheral portion of said processing tool, each of said cutting teeth being formed in such a manner as to project more radially outwardly by a predetermined amount than a preceding one of said cutting teeth as said processing tool rotates.

5. An equal-pitch groove processing device according to claim 1, wherein said controlling means controls the transfer speed of said workpiece on the basis of the rotational speed of said processing tool.

6. An equal-pitch groove processing device according to claim 1, wherein said controlling means controls the rotational speed of said processing tool on the basis of the transfer speed of said workpiece.

* * * * *